Fig. 1
Fig. 2
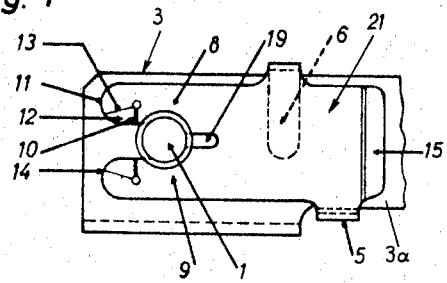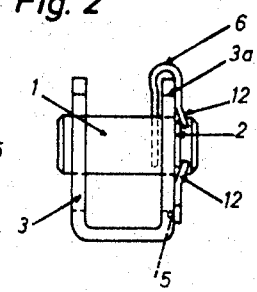
Fig. 3
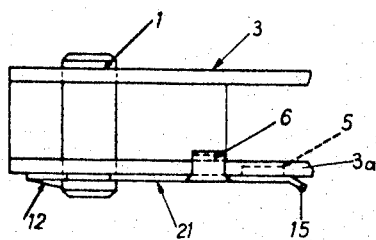
Fig. 4
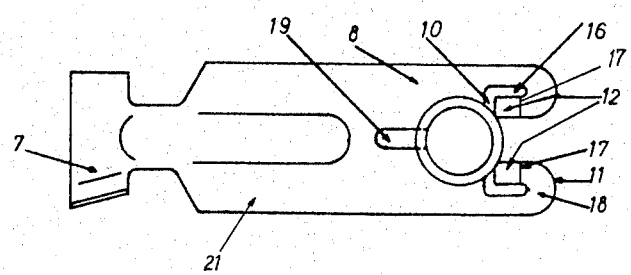
Fig. 5
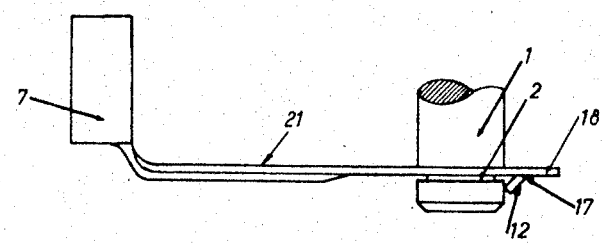
INVENTOR.
WALTER ENGELMANN
BY
ATTORNEYS July 8, 1969 W. ENGELMANN 3,453,926
ROTATABLE AND INTERCHANGEABLE PIN SUPPORTING FIXTURE
Filed June 14, 1966 Sheet 2 of 3

INVENTOR.
WALTER ENGELMANN
BY Dicke & Craig
ATTORNEYS

July 8, 1969 W. ENGELMANN 3,453,926
ROTATABLE AND INTERCHANGEABLE PIN SUPPORTING FIXTURE
Filed June 14, 1966 Sheet 3 of 3

INVENTOR.
WALTER ENGELMANN
BY Dicke & Craig
ATTORNEYS

United States Patent Office 3,453,926
Patented July 8, 1969

3,453,926
ROTATABLE AND INTERCHANGEABLE PIN SUPPORTING FIXTURE
Walter Engelmann, Goppingen, Germany, assignor to Fibora AG, Zurich, Switzerland
Filed June 14, 1966, Ser. No. 557,572
Int. Cl. F16b *19/00, 21/00, 37/02*
U.S. Cl. 85—8.8                                18 Claims

ABSTRACT OF THE DISCLOSURE

A fixture of the kind adapted to be used in connection with a pin, and in particular with a headless pin pivotally and interchangeably supported in a fork head or in bearing jaws or the like, said fixture including a mounting strip preferably made in one piece and engaging one end of the pin, which strip, in order to prevent co-rotation around the axis of the pin, is clamped in place or attached at one of its ends at the fork head or at a bearing jaw of the like. The mounting strip includes walls radially and axially engaging the pin to prevent relative movement therebetween in all radial directions and one axial direction. One of the walls includes spring fingers resiliently deformable during insertion and spring snapping into engagement with the pin upon reaching the final assembled position to prevent relative movement opposite to the direction of insertion.

BACKGROUND OF THE INVENTION

Fixtures of this kind are used in practice, for instance, in automotive engineering, in large quantities. Also, it is essential that the mounting strip be inexpensive in manufacture, easy to fit and re-usable several times; furthermore, it is important that the pin be safely held in position, be interchangeable and be rotatable as far as possible, and moreover, that even after a long service the fixture affords the necessary safety. In prior art type fixture the mounting strip is retained in place at one of its ends on a fork head or the like, whereas its other end is riveted to the pin. The resulting disadvantage is that the pin alone cannot be interchanged and, moreover, there is a risk that owing to the torsional moments applied to the pin the mounting strip is rotated along and, in doing so, it may be disconnected from the fork head or the like.

To eliminate this disadvantage, provision was made for pivotally riveting one end of the mounting strip to the pin. However, it was found that owing to corrosion and contamination such a connection is likely to affect the rotatability, so that the pin will then transfer the torque also to the mounting strip.

SUMMARY OF THE INVENTION

The object underlying this invention consists in providing a fixture of the kind referred to at the beginning, which avoids the indicated disadvantages of the prior art types and which satisfies the above requirements to be met by such fixtures. To attain this object, the mounting strip according to the present invention includes in combination, on the one hand, portions capable of being inserted into an annular groove and retained therein, preferably under clamping tension and, on the other, resilient portions engaging the pin and positively locking the mounting strip contrary or opposite to the direction of insertion. By combining these features partly known in connection with safety clips and by using them in a mounting strip of the type referred to above, a pin fixture can be provided which will completely satisfy the set requirements. Provision is made for a two-fold locking, by way of the clamping tension of the strip portions engaging in the annular groove of the pin, on the one hand, and by way of the positive lock effective contrary to the direction of insertion, on the other hand. The clamping tension in the annular groove may operate either radially or axially or else is produced together with the positive lock. Due to the aforementioned double locking the annular groove can be made relatively large so that there will be a far lesser risk for the pin of getting jammed owing to corrosion and contamination than in the previously mentioned prior art type, in which the strip is pivotally riveted to the pin.

Furthermore, a substantial advantage of the invention lies in the fact that the pin, which is inserable and interchangeable by itself, can be hardened and ground. This was a frequently set requirement which, however, could not be met up to the present, since hardened pins cannot be riveted, which it would be necessary to do in the previously mentioned prior art type. It would be most difficult to pack up the rivet spigot of the prior art type embodiment or anneal it again later on. Every single pin would have to be treated in this manner which would be much too expensive. Moreover, according to the present invention, the pin can be provided with oil grooves, an internal bore and with grease nipples, which, in the case of continuously moving pins, is also an advantage.

The scope of the present invention allows various embodiments, each of which has its particular advantages. In the first group of embodiments, with strip portions radially insertable into the annular groove, the positively locking strip portions are comprised of resilient tongues deflected in the axial direction of the pin which include, towards the leading end of the mounting strip, a leading face or leading edge sloping off to the level of the strip portions engaging in the annular groove, whereas opposite to the leading end the tongues include a shoulder each of which, after the tongues have sprung back to their inactive position, comes to rest against the wall of the pin. In a further improvement thereof, the shoulder portion of the deflected tongues is separated by a slot from the strip portions engaging in the annular groove and the tongues themselves are preferably adapted to be resiliently operative in such a manner that they will themselves be sufficiently effective to spring into their active and inactive positions for inserting and positively locking the mounting strip. After this mounting strip made in accordance with the present invention has been inserted in a radial direction into the annular groove of the pin, it will be safely held in position by the resilient tongues, the slot edge of which abuts against the wall of the pin after said tongues have reassumed their inactive positions. As the strip is inserted in a radial direction the resilient tongues will be automatically depressed by the side walls of the pin groove, so that fitting in place can be effected without the use of special tools. If the mounting strip is to be removed again, it will only be necessary to depress the resilient tongues to the level of the annular groove, e.g., by means of a screwdriver. The mounting strip may then be readily pulled out in a radial direction.

In another advantageous embodiment distinguishing itself by its simplicity in design, the resilient tongue is deflected along a line extending in the direction of insertion or slightly inclined thereto. In a further preferred embodiment a longitudinal slot extends in the mounting strip from the aforementioned slot towards the leading end, adjacent to which longitudinal slot the tongue is deflected along a line extending somewhat transversely of the direction of insertion. The effect obtained thereby is that the resiliency of the tongue will be improved upon that of the first embodiment previously described. As a result, relatively little force must be applied for inserting the mounting strip. Moreover, due to the deflection of the tongue along a transverse line a considerable locking effect is obtained, so that the safety will be particularly increased.

Preferably, any such tongue will be deflected in accordance with the invention on either side of the pin. Under certain circumstances, however, it may be sufficient to provide for such a locking tongue only on one side of the pin.

In a second group of embodiments falling within the principle of the present invention, with strip portions radially insertable into the pin grooves, the positively locking strip portions consist of a resilient tongue effective in the axial direction of the pin, capable of being slipped axially over the end of the pin and then positively gripping said pin end at the rear or embracing it opposite to the direction of insertion of the mounting strip. In a further improvement, this tongue is associated with a resilient tongue section operative in the axially direction of the pin, which tongue section, upon insertion of the mounting strip, exerts a pressure upon axial surfaces of the pin and thus imparts a clamping tension to the strip portions engaging in the pin groove. In another embodiment the tongue is formed of a deflected portion of the mounting strip and the resilient second tongue section is cut out therein, an aperture being preferably arranged in the mounting strip for axial insertion of the pin, immediately followed by a narrower recess for radial insertion into the pin groove. In a still further embodiment distinguishing itself by simplicity in design and inexpensive manufacture, the tongue is made up of a central section of the mounting strip, confined by notches or slots on either side, and includes in the neighborhood of its free end a recess for positive engagement of a peg or the like, tapped into the end of the pin, said tongue forming at the same time the resilient tongue section axially pressing upon the pin. Any such tongue, therefore, also provides a positive lock and imparts an axial clamping tension to the strip portions engaging in the pin groove.

In still another embodiment according to the invention, with the tongue formed of a deflected portion of the mounting strip, the latter includes a recess opening towards the deflection for insertion of the strip into the pin groove and on the pin side pointing to the deflection, the tongue is provided with a bearing surface for the pin. This embodiment may be very useful with regard to the requirement that the mounting strip must be cut to size from a spring plate, since the deflected tongue, when cut to size, may form an extension of the elongated mounting strip. In another embodiment preferred for easier insertion of the mounting strip, the tongue originates from the strip transversely of the longitudinal direction thereof and the strip has a recess opening in a direction transversely of the deflection for insertion of the mounting strip into the pin groove.

In a further group of embodiments within the scope of the principal of the present invention, the mounting strip is provided with at least two tongues located opposite each other, extending radially of the pin and whose resiliency is effective in the axial direction of the pin, these tongues engaging in the pin groove and being axially insertable therein. In this arrangement the mounting strip may be riveted to the fork head or to any other part or may be firmly attached in a similar manner. Indeed, the strip no longer requires displacement in a radial direction for interchanging the pin, since the latter is pressed into position in an axial direction and may be removed therefrom for interchanging by pressing further on in the same direction. In another advantageous embodiment within this group the mounting strip has an opening for penetration by the pin and the tongues engaging in the pin groove extend outwardly from the strip and are deflected through an angle of approximately 180°. Also, these tongues are provided preferably adjacent to the deflection with a corrugation making it possible for the tongues to be withdrawn from the pin groove even in a radial direction. A tool may very well be applied to this corrugation or deflection. This embodiment enables the mounting strip to be firmly attached to a machine part or the like and at the same time permits a radial insertion and removal of the strip portions engaging in the pin groove, which presents an advantage when the pin is to be withdrawn for using it again. In a still further embodiment within this group the tongues engaging in the pin groove extend inwardly from the edge of a strip recess surrounding the pin and engage in the pin groove in an inclined angular position in the axial direction of the pin so that the engagement is effected therein under a clamping tension.

BRIEF DESCRIPTION OF THE DRAWING

Further details and advantages of the present invention will appear from the following description of several embodiments according to the invention illustrated in the drawing and from the claims. In the drawing:

FIGURES 1 to 3 are, respectively, an elevation, a left side view thereof and a top plan view of a first embodiment according to the present invention, with the mounting strip secured on a bearing jaw of a U-shaped portion supporting the pin;

FIGURES 4 and 5 are, respectively, an elevation and a top plan view of a second embodiment according to the present invention, with a pin placed in position.

DETAILED DESCRIPTION OF THE DRAWING

Figure 14:
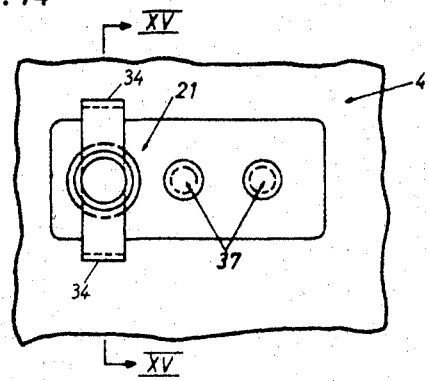
FIGURES 14 and 15 are, respectively, an elevation and a section taken on the line XV—XV in FIGURE 14 of a seventh embodiment according to the present invention, with the pin placed in position and showing part of the mounting wall.
Figure 15:
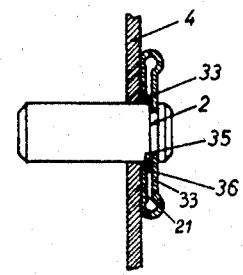
Figure 16:
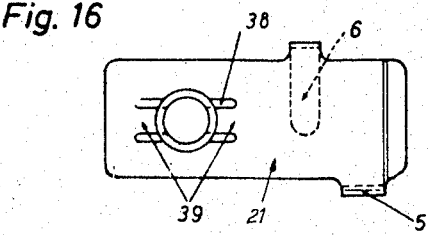
FIGURES 16 and 17 are, respectively, an elevation and a plan view of an eighth embodiment according to the present invention, with the pin placed in position.
Figure 17:
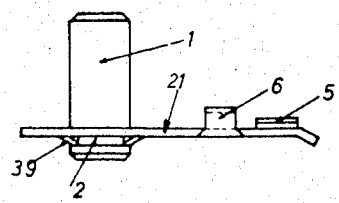
Figure 18:
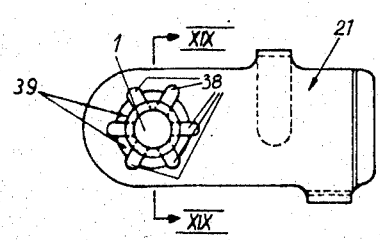
FIGURES 18 and 19 are, respectively, an elevation and a section taken on the line XIX—XIX in FIGURE 18 of ninth embodiment according to the present invention, with the pin placed in position.
Figure 19:
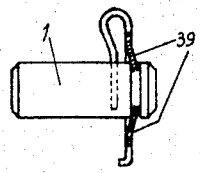

In the pin fixture illustrated in the drawing, the pin is generally designated by reference numeral 1 and the annular groove thereof by reference numeral 2. In the embodiment according to FIGURES 1–3, the pin is supported in a U-shaped bearing member generally designated by reference numeral 3. As in the embodiment according to FIGURES 14 and 15, it may, however, also be supported, e.g., in a wall 4 or in a fork head or the like.

In all of the embodiments shown in the drawings the mounting strip according to the present invention is made from an elongated piece of spring steel sheet, from which the various strips and tongues originate or into which they are worked. At one of its ends the mounting strip is connected to a machine part or the like. To this end, the embodiments according to FIGURES 1–3, 8–13 and 16–19 have a stop dog or abutment nose portion 5 arranged on one longitudinal edge of the strip and a bent clamping element 6 on the opposite longitudinal edge. The stop dog or abutment nose portion 5 rests against the lower edge of a bearing jaw 3a of the bearing member 3, as shown, e.g. in the drawing. The clamping element 6 engages over the upper edge of the bearing jaws 3a. In the embodiments according to FIGURES 4, 5 and 6, 7 the mounting strip terminates in a clamping element 7 which may be clamped in place, e.g., on a fork head. Other types of attachment for example, by means of snap latches, are also feasible.

In the embodiment according to FIGURES 1-3, two legs 8 and 9 are provided on the front end of the mounting strip generally designated by reference numeral 21, i.e., on the left end thereof as viewed in FIGURE 1, the legs 8 and 9 engaging in the pin groove 2 and gripping the pin partly rearwardly thereof. Each of the free ends of the legs 8, 9 has a transverse slot 10 open towards the inner edge worked into it, adjacent to which extends towards the leading end 11 of the mounting strip 21 a tongue 12 deflected along a line 13 in the axial direction. The line 13 runs, as will be seen from FIGURE 1 of the drawing, from the inner end of the transverse slot 10 towards the leading end 11 in the direction of insertion, consequently parallel to the legs 8, 9. However, it may also extend slightly inclined in a forward direction and inwardly. A set-off is formed by that edge of the deflected tongue 12 pointing to the transverse slot, which set-off comes to rest against the wall of pin 1 adjacent to the pin groove 2, as shown in FIGURES 2 and 3. The leading end 11 of the legs 8 and 9 is forwardly and outwardly chamfered for easier insertion into the annular groove. In this way an upwardly sloping leading edge 14 is obtained on the tongue 12, through which edge the respective tongue 12 is automatically depressed as the mounting strip is inserted. Due to the elastic properties of the spring steel material the tongue 12 resiliently springs back into its previous position, after it gets clear of the annular groove 2 upon complete insertion, in order to lock the mounting strip 21 against withdrawal in the intended manner. The other end of the mounting strip has a portion 15 slightly deflected. It can be used for gripping to withdraw the mounting strip. In doing so, it is merely necessary to cause the tongues 12, such as by means of pliers or a screwdriver to spring into the position up to the level of the annular groove 2.

The embodiment according to FIGURES 4 and 5 differs from the embodiment described above mainly in that a longitudinal slot 16 extends adjacent to the transverse slot 10 in the legs 8 and 9 and in that the tongue 12 is deflected along a line 17 running transversely of the direction of insertion. Forwardly of line 17 there extends a flat section 18 of the legs 8, 9 to the leading end 11 thereof, which section facilitates insertion into the annular groove. The upper side of tongue 12 defines an upwardly sloping, leading surface by which the tongue is automatically depressed as the mounting strip is inserted into position. In this embodiment, the clamping member 7 is adapted for gripping, in order to remove the mounting strip 21.

The scope of the present invention still admits of a few modifications of the two embodiments illustrated in FIGURES 1-5. Under certain circumstances, the transverse slot 10 could, e.g., be omitted, if at this point the material of the mounting strip 21 is pressed up such that a steep set-off is formed sufficient to lock in a positive manner the mounting strip contrary or opposite to the direction of insertion. The arrangement of a transverse slot 10 and still more the arrangement of the additional longitudinal slot 16 in the embodiment according to FIGURES 4 and 5 makes it possible however for the tongues to be resiliently operative to such an extent as to allow a completely flat design of the legs 8 and 9 and of the portions extending adjacent thereto, since the tongues 12 are themselves sufficiently operative to spring into and out of position for the purpose of inserting and positively locking the mounting strip.

As already described, the legs 8 and 9 are adapted in the embodiments according to FIGURES 1-5 to grip the pin 1 at the rear thereof. In order to facilitate the radially resilient disengagement necessary to this effect, as the mounting strip is inserted in the pin groove 2, a longitudinal slot 19 is cut out between the legs 8 and 9. The tongues 12 of the embodiments according to the invention shown in FIGURES 1-5 may, however, also be formed with straight legs, and respectively with legs not radially disengaging in a resilient manner during insertion.

Figure 6:
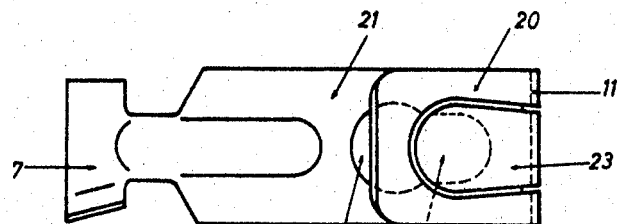
FIGURES 6 and 7 are, respectively, an elevation and a plan view of a third embodiment according to the present invention, with a pin placed in position.
Figure 7:
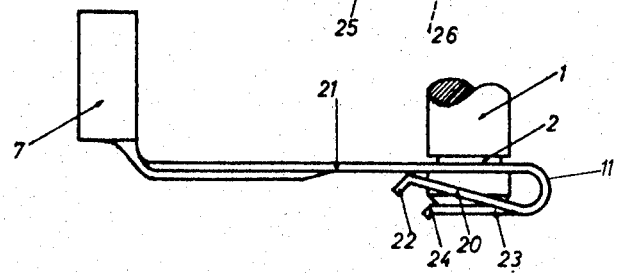

In the embodiment according to FIGURES 6 and 7 a tongue 20 forming an extension of the mounting strips is deflected through more than 180°, so that its resiliency is effective in the axial direction of the pin 1 and presses against the main portion 21 of the mounting strip. The end of the tongue 20 is provided with a gripping member 22 to lift it for inserting the mounting strip into the pin groove 2. Thereafter, the tongue 20 springs back to provide a positive lock contrary or opposite to the direction of insertion. As shown in the drawing, a second tongue portion 23 is cut out in the middle of the tongue 20 which is also resiliently effective in the axial direction and presses upon insertion against the front end of the pin 1. The free end of the tongue portion 23 also carries a small gripping member 24. The tongue portion 23, however, may be cut out in such a manner as to start only at the rear of the deflection of tongue 20 and to make it possible in this way to be bent upwardly together with the tongue 20. This is to facilitate insertion.

In the embodiment according to FIGURES 6 and 7 an aperture 25 is provided in the main portion 21 of the mounting strip for insertion into the pin groove 2, which aperture is followed towards the leading end 11 by a smaller recess 26 to edges of which engage in the pin groove 2.

Figure 8:
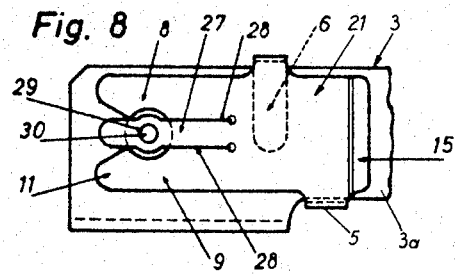
FIGURES 8 and 9 are, respectively, an elevation and a plan view, partly in section, of a fourth embodiment according to the present invention, with a pin placed in position and showing the U-shaped bearing portion to which is secured the mounting strip.
Figure 9:
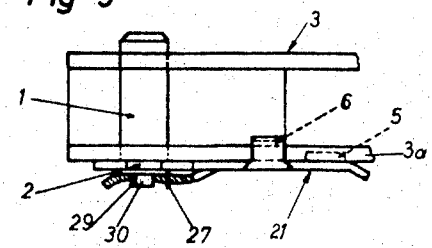

In the embodiment shown in FIGURES 8 and 9 the mounting strip 21 is again provided with two legs 8 and 9 between which a central portion is adapted to form a tongue 27. The tongue 27 is delimited on both sides by notches 28 or slits and is adapted to be resiliently operative in an axial direction. In proximity of its free end, the tongue 27 has a recess 29 by means of which it engages over a peg 30 machined or tapped at the front end of pin 1 adjacent to the annular groove 2, so that the mounting strip 21 is positively connected to the pin 1 contrary or opposite to the direction of insertion. Moreover, the tongue 27 presses upon the shoulder of pin 1 located adjacent to the peg 30 and consequently exerts an axial pressure upon the pin 1.

In the two embodiments shown in FIGURES 6-9, an axial pressure is exerted upon the pin by the tongue portion 23 and the tongue 27, respectively, which pressure causes the mounting strip portions engaging in the annular groove 2 of the pin to be urged under clamping tension against the side wall of the annular groove 2. The embodiment illustrated in FIGURES 8-9 provides in addition that the legs 8 and 9 the pin 1 at the rear so that the legs will be tightly seated in position in the pin groove 2 both under radial and axial tension.

The embodiment according to FIGURES 8 and 9 is especially distinguished by its ease in manufacture. Indeed, there are no parts at the front end of the mounting strip 21 which require bending as in the embodiment according to FIGURES 6 and 7. Any such bending necessitates several operational steps so that the labor saving will be considerable. Tapping the peg 30 on the pin 1 can, however, be effected very quickly and inexpensively by automatic machinery.

Figure 10:
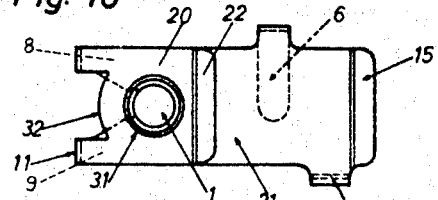
FIGURES 10 and 11 are, respectively, an elevation and a plan view of a fifth embodiment according to the present invention, with the pin placed in position.
Figure 11:
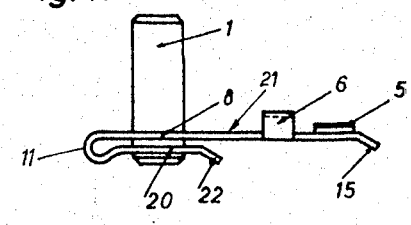

The embodiment show in FIGURES 10 and 11 differs from that illustrated in FIGURES 6 and 7 mainly in that the resilient second tongue section is dispensed with. A substantially circular opening 31 is provided in the bent tongue 20, which opening engages over the pin head. The free end of the tongue 20 has again a gripping member 22. Instead of the aperture 25 and the recess 26 in the embodiment according to FIGURES 6 and 7 the mounting strip portions engaging in the pin groove 2 are formed after the pattern of the legs 8 and 9 of the embodiments shown in FIGURES 1-5. Consequently, the legs 8 and 9 form between them a leading recess 32 opening towards the point of deflection, so that the mounting strip is moved, headed by the bent around portion 11, over the pin into the pin groove. To this end, the tongue 20 is resiliently released at its free end and lifted over the pin end. Due to the legs 8 and 9 getting narrower towards the bent-around portion 11 and projecting beyond this portion into the tongue 20, the latter can be released without physical exertion from its resiliently effective position.

Figure 12:
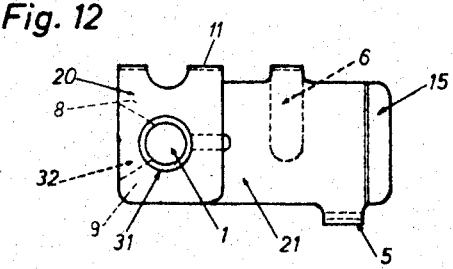
FIGURES 12 and 13 are, respectively, an elevation and a left side view thereof of a sixth embodiment according to the present invention, with the pin placed in position.
Figure 13:
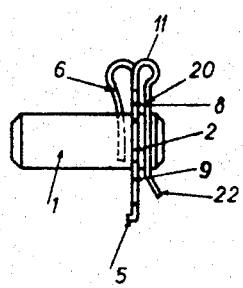

The embodiment according to FIGURES 12 and 13 differs from that shown in FIGURES 10 and 11 principally in that the tongue 20 originates transversely of the direction of insertion from the main portion 21 of the mounting strip. As a result, the leading recess 32 will be located transversely of the bent-around portion 11 so that for the purpose of inserting the mounting strip the tongue 20 need not be released from its resiliently effective position to the extent necessary in the embodiment of FIGURES 10 and 11. Provision might also be made in that case to slightly deflect the tongue 20 at the leading end so that its disengagement from the resiliently operative position could under some circumstances be effected by the pin head itself. In the two embodiments according to FIGURES 10–13 provision is made that the legs 8 and 9 engaging in the pin groove 2 embrace the pin rearwardly thereof, i.e. radially deflect upon insertion and preferably then are retained in position under a radial tension. However, the arrangement according to the present invention as well as the configuration of the tongue 20 and of the leading recess 32 as shown in the embodiments according to FIGURES 10–13 can also be carried into effect with mounting strips having straight legs and/or having legs not radially disengagingly deflecting from the resiliently effective position upon insertion. Under some circumstances, the embodiment according to FIGURES 12 and 13 may be more useful, as far as its shape is concerned, in connection with the clamping member 6 than the embodiment illustrated in FIGURES 10 and 11.

The embodiments shown in FIGURES 14–19 are different from the foregoing embodiments in that the mounting strip 21 is inserted in an axial direction into the pin groove 2, or, conversely, that the pin 1 is inserted in an axial direction in the mounting strip 21. To this end, the mounting strip 21 according to the embodiment of FIGURES 14 and 15 includes two tongues 33 which originate outwardly from the main portion 21 of the mounting strip and are deflected through an angle of about 180°. The free ends of these tongues 33 engage in the pin grooves 2. The deflected portion is provided with a corrugation 34 so that the tongues 33 may disengage from their resiliently effective position also in a radial direction and, as a result, may be withdrawn from the pin groove 2 in a radial direction. The main portion 21 of the mounting strip has an opening 35 for penetration by the pin 1. The edge of this opening 35 is flanged at 36 towards the tongues 33 so that a guide is formed for the pin 1 in which the latter is safely seated. In this embodiment the mounting strip is riveted to a wall 4 by means of rivets 37.

In the two embodiments illustrated in FIGURES 16 to 19, short tongues 39 protrude inwardly from the edge of a mounting strip recess 38 surrounding the pin 1, which tongues engage in the annular groove 2 upon insertion of the pin. These tongues 39 are so dimensioned that in the axial direction of the pin 1 they come to rest in the annular groove 2 in an inclined angular position and accordingly are firmly retained under radial tension in the annular groove. In the embodiment shown in FIGURES 16 and 17 two tongues 39 located opposite each other are provided, whereas in the embodiment according to FIGURES 18 and 19 a ring including six tongues 39 is arranged around the pin. Due to these tongues 39 and, respectively, due to the tongues 33 in the embodiment according to FIGURES 14 and 15 the mounting strip will at the same time be positively locked contrary or opposite to the direction of insertion. If pin 1 requires replacement, all that must be done in the embodiments according to FIGURES 16 to 19 is to push through the pin 1 in the direction of insertion. The same will be feasible in the embodiments illustrated in FIGURES 14 and 15.

The scope of the present invention still admits of some other modifications of the illustrated embodiments. For instance, instead of deflected tongues, special strip portions attached, such as by riveting, to the main portion of the mounting strip could be used. However, the embodiments shown in the drawing are particularly useful, each of which has its particular advantage which, in one embodiment may be ease in manufacture, or safety in another embodiment, or the facility in fitting it or the small size or the savings achieved in cutting it to size.

While I have shown and described several embodiments in accordance with the present invention, it is understood that the same is not limited thereto but is susceptible of numerous changes and modifications as known to a person skilled in the art.

I claim:

1. A fixture with an assembled and a pre-assembled position, comprising: a pin having an annular groove and an axis; a part relatively fixed with respect to said pin; a sheet metal mounting strip having one portion rotatably engaging said pin and having another portion firmly held on the relatively fixed part to prevent rotation of said mounting strip about the axis of the pin in unison with the pin in the assembled position; said mounting strip having a substantially planar U-shaped body portion with two substantially planar legs substantially axially non-stressed in the preassembled position and in the assembled position on opposed sides of said pin in said annular groove; the free outer ends of said legs each having a resilient tongue extending angularly away from the plane of said body portion and toward the opposite ends of said legs for a width transverse to said body portion plane, that is substantially greater than the axial width of said groove; said tongues being substantially non-stressed in the preassembled position and in the assembled position to constitute snap cam means to be cammed toward the plane of said body portion by the opposed walls of said groove during assembly with said legs moving into said groove and for snap relaxing into the assembled position extending axially beyond and outside said groove for form-lockingly preventing withdrawal of said mounting strip opposite to the direction of assembly.

2. The fixture according to claim 1, wherein said legs are radially resiliently stressed in the assembled position to radially clamp said pin.

3. The fixture according to claim 2, wherein said legs have opposed portions extending radially inwardly toward each other within the plane of said body portion to a distance from each other substantially less than the interior diameter of said pin groove on the same side of said pin as said free ends.

4. The fixture according to claim 3, wherein said legs include aligned transverse slots opening toward each other forming said tongues.

5. The fixture according to claim 4, wherein only said tongues are axially deformed during assembly with said pin.

6. The fixture according to claim 5, wherein each of said tongues is connected with the remaining portion of said legs by a bend line extending generally in the direction of relative movement during assembly with said pin.

7. The fixture according to claim 6, wherein said bend line is slightly angularly inclined with respect to the direction of relative movement during assembly with said pin.

8. The fixture according to claim 5 wherein each of said legs includes a longitudinal slot connected with the outer end of the respective one of said transverse slots at substantially right angles; each of said legs having a substantially transverse bend line separating the respective tongue from the remainder of said legs and extending substantially parallel to the corresponding transverse slot.

9. The fixture according to claim 8, wherein each tongue is at least chamfered on the side pointing toward the annular groove in a direction toward the free ends of the mounting strip.

10. The fixture according to claim 9, wherein said mounting strip further includes abutment means arranged on one of the longitudinal edges thereof and connected to said relatively fixed part and a deflected clamping member arranged on the opposite longitudinal edge thereof.

11. The fixture according to claim 1, wherein said legs have opposed portions extending radially inwardly toward each other within the plane of said body portion to a distance from each other substantially less than the interior diameter of said pin groove on the same side of said pin as said free ends.

12. The fixture according to claim 1, wherein said legs include aligned transverse slots opening toward each other forming said tongues.

13. The fixture according to claim 12, wherein each of said legs includes a longitudinal slot connected with the outer end of the respective one of said transverse slots at substantially right angles; each of said legs having a substantially transverse bend line separating the respective tongue from the remainder of said legs and extending substantially parallel to the corresponding transverse slot.

14. The fixture according to claim 1, wherein only said tongues are axially deformed during assembly with said pin.

15. The fixture according to claim 1, wherein each of said tongues is connected with the remaining portion of said legs by a bend line extending generally in the direction of relative movement during assembly with said pin.

16. The fixture according to claim 15, wherein said bend line is slightly angularly inclined with respect to the direction of relative movement during assembly with said pin.

17. The fixture according to claim 1, wherein each tongue is at least chamfered on the side pointing toward the annular groove in a direction toward the free ends of the mounting strips.

18. The fixture according to claim 1, wherein said mounting strip further includes abutment means arranged on one of the longitudinal edges thereof and connected to said relatively fixed part and a deflected clamping member arranged on the opposite longitudinal edge thereof.

References Cited

UNITED STATES PATENTS

| | | | |
|---|---|---|---|
| 1,056,392 | 3/1913 | Barr et al. | 85—8.8 |
| 2,237,465 | 4/1941 | Zimmerman | 85—8.8 |
| 2,755,698 | 7/1956 | Wurzel | 85—8.8 |
| 3,115,805 | 12/1963 | Engelmann | 85—8.8 |
| 2,845,291 | 7/1958 | Priestman | 85—8.8 |
| 2,894,302 | 7/1959 | Fox | 85—8.8 |

FOREIGN PATENTS 522,360   3/1956   Canada.

EDWARD C. ALLEN, *Primary Examiner.*